US 6,573,877 B2

(12) United States Patent
Wedel et al.

(10) Patent No.: US 6,573,877 B2
(45) Date of Patent: *Jun. 3, 2003

(54) INSTRUMENT PANEL WITH SYSTEM OF TRANSPARENT COLORED LAYERS

(75) Inventors: Hans Kurt Wedel, Mühltal (DE);
Franz-Josef Kaboth, Weilrod (DE);
Kurt Bach, Langenselbold (DE);
Andreas Habeney, Kelkheim (DE);
Michael Herzog, Darmstadt (DE);
Klaus Rietzler, Bergkamen (DE);
Detlev Brosda, Grossumstadt (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,571

(22) PCT Filed: Jan. 17, 1998

(86) PCT No.: PCT/EP98/00237

§ 371 (c)(1),
(2), (4) Date: Nov. 18, 1999

(87) PCT Pub. No.: WO98/36420

PCT Pub. Date: Aug. 20, 1998

(65) Prior Publication Data

US 2002/0089468 A1 Jul. 11, 2002

(30) Foreign Application Priority Data

Feb. 13, 1997 (DE) .......................................... 197 05 536

(51) Int. Cl.⁷ ................................................ G09G 5/00
(52) U.S. Cl. .................................... 345/4; 345/5; 345/7
(58) Field of Search ............................... 345/5, 1, 3, 4, 345/7, 9, 22, 3.1

(56) References Cited

U.S. PATENT DOCUMENTS

| 4,720,704 A | * | 1/1988 | Baeger et al. ................. 345/38 |
| 4,845,595 A | * | 7/1989 | Fujii et al. ..................... 362/30 |
| 4,884,872 A | * | 12/1989 | Klein et al. .................. 359/811 |
| 5,032,711 A | * | 7/1991 | Yamada ..................... 250/461.1 |
| 5,734,627 A | * | 3/1998 | Sy ................................. 368/67 |
| 5,790,708 A | * | 8/1998 | Delean ........................ 382/270 |
| 5,934,782 A | * | 8/1999 | Atkins et al. .................. 362/26 |
| 6,065,846 A | * | 5/2000 | Kato et al. ..................... 362/30 |

FOREIGN PATENT DOCUMENTS

| DE | 3828373 | 2/1990 |
| EP | 0707197 | 4/1996 |
| GB | 2014313 | 8/1979 |

* cited by examiner

*Primary Examiner*—Matthew C. Bella
*Assistant Examiner*—Mackly Monestime
(74) *Attorney, Agent, or Firm*—Martin A. Farber

(57) ABSTRACT

An instrument panel, in particular for a display in a motor vehicle, with a sheet-like carrier (7) on which colors have been applied for representing a scale and/or characters and/or symbols as well as for covering the regions outside the contours of the scale, characters or symbols. The colors of the scale, characters or symbols comprise a system of layers (13) formed by a plurality of transparent color layers of different coloration fully or partially covering over one another.

19 Claims, 3 Drawing Sheets

INSTRUMENT PANEL WITH SYSTEM OF TRANSPARENT COLORED LAYERS

The invention relates to an instrument panel, in particular for a display in a motor vehicle, with a sheet-like carrier on which colors have been applied for representing a scale and/or characters and/or symbols as well as for covering the regions outside the contours of the scale, characters or symbols.

In the case of such instrument panels, it is known for the creation of color representations to apply the particular color [lacuna] the carrier at the places for a scale, characters and symbols that are to be perceptible in this particular color. This application of color takes place by means of screen printing and requires that a color with exactly the desired coloration is used. Since instrument panels for a display in a motor vehicle are usually provided with a plurality of color imprints, these different colors must be available in the respectively desired coloration. The color tones of the colors to be used in the case of different displays are usually not the same, so that stockkeeping with a large number of colors is required and, if there is a change of instrument panels to be printed, this causes great expenditure on re-equipping.

SUMMARY OF THE INVENTION

It is therefore the object of the invention to provide an instrument panel of the type specified at the beginning which can be produced with the widest variety of color tones in a simple way.

This object is achieved according to the invention by the colors of the scale and/or the characters and/or the symbols comprising a system of layers formed by a plurality of transparent color layers of different coloration fully or partially covering over one another. This formation allows any desired color toning to be achieved with few basic colors by appropriate printing one on top of the other. Consequently, only the basic colors have to be available for a wide variety of color tones, so that the stockkeeping of the colors can be kept down. Re-equipping for other color tones to be produced in the case of a wide variety of instrument panels is no longer needed.

The sheet-like carrier may be both opaque, with preferably white coloration, and transparent or translucent as well as able to be transilluminated by a light source from its side facing away from the observer. The incident light reflected in this case at the carrier or the transmitted light passing through the carrier radiates through the transparent color layers covering over one another and thus creates the respectively desired color toning by mixing.

A particularly fine structure, which also permits particularly smooth color transitions, is achieved by the transparent color layers of the system of layers being applied to the carrier in a grid of points, it being possible for the points of the grid of points to be approximately between 400 and 3000 points per inch, in particular approximately 800 points per inch. This gives such a fine resolution of the grid of points that it is no longer seen by the human eye as a grid but as a homogeneous color.

The points of the grid of points may be of equal size or else of different sizes.

As an alternative to the transparent color layers applied in a grid of points, these transparent color layers may also be applied to the carrier as sheet-like areas of color, the sheet-like areas of color preferably corresponding to the areas of the scale and/or the characters and/or the symbols.

If the transparent color layers of the system of layers are covered from the observer side by a transflective color layer, the color of the transflective color layer is visible when there is incident light from the front and the color of the transparent color layers, or a mixed color composed of the transparent color layers and the transflective color layer, is visible when there is transmitted light from the rear side of the instrument panel.

In this case, the transflective color layer is preferably white.

If the transflective color layer is cut away in parts of the scale and/or the characters and/or the symbols and transparent color layers fully or partially covering over one another, forming a further system of layers, [lacuna] applied to the carrier in the region of the cutaway, the region of the cutaway can be seen in a different color when there is incident light than the part covered by the transparent color layer. This makes it possible, for example, to present a particular part, such as the end region of a scale for example, in a distinctive red color for example, while the other part of the scale appears white.

To even out the uneven light-intensity distribution of the light source illuminating Instrument panel from the rear side, an evening-out print corresponding to the light-intensity distribution of the light source may be applied, fully or partially covering over the carrier, on the side of the first and/or further system of layers facing away from the observer.

If in this case the evening-out print comprises color layers which fully or partially cover over one another and are applied in a grid of points or as areas of color of variable density, an evening-out print having smooth transitions adapted to the finest differences in light intensity can also be created by the fine structure of the evening-out print.

The first system of layers and/or the transflective layer and/or the further system of layers and/or the evening-out print may be applied to the carrier on the side facing the observer or on the side facing away from the observer. If all the layers are applied to the carrier on the same side, this simplifies the operation of printing these layers.

The sheet-like carrier may be a sheeting, in particular a sheeting consisting of polycarbonate.

To increase the adhesiveness of the color coating on the carrier, in particular on the carrier in the form of a sheeting, an adhesion-promoter layer may be arranged on the side of the carrier bearing a color coating, between the carrier and the color coating.

The color covering the regions outside the contours of the scale, the characters or symbols may be an at least largely opaque, in particular black, color. This increases the contrast between the area of the display and the scale, characters or symbols and consequently improves the good readability.

Each of the transparent color layers of the first and/or further system of layers may be applied to the carrier in a separate printing operation.

If the first and/or further system of layers is applied to the carrier as a separately created system of layers, these systems of layers can be produced with very high dimensional accuracy and avoid register problems when printing onto the carrier.

The first system of layers and/or the transflective layer and/or the further system of layers and/or the evening-out print and/or the opaque color may be applied to the carrier in separate printing operations.

A simplification of the printing operation and increase in dimensional accuracy of the individual layers with respect to one another is achieved if the first system of layers and/or the transflective layer and/or the further system of layers and/or the evening-out print and/or the opaque color are applied to the carrier as a separately created system of layers.

BRIEF DESCRIPTION OF THE DRAWINGS

Exemplary embodiments of the invention are described in more detail below and are represented in the drawings, in which.

DETAILED DESCRIPTION OF THE PREFERRED EMBODIMENT

Figure 1:
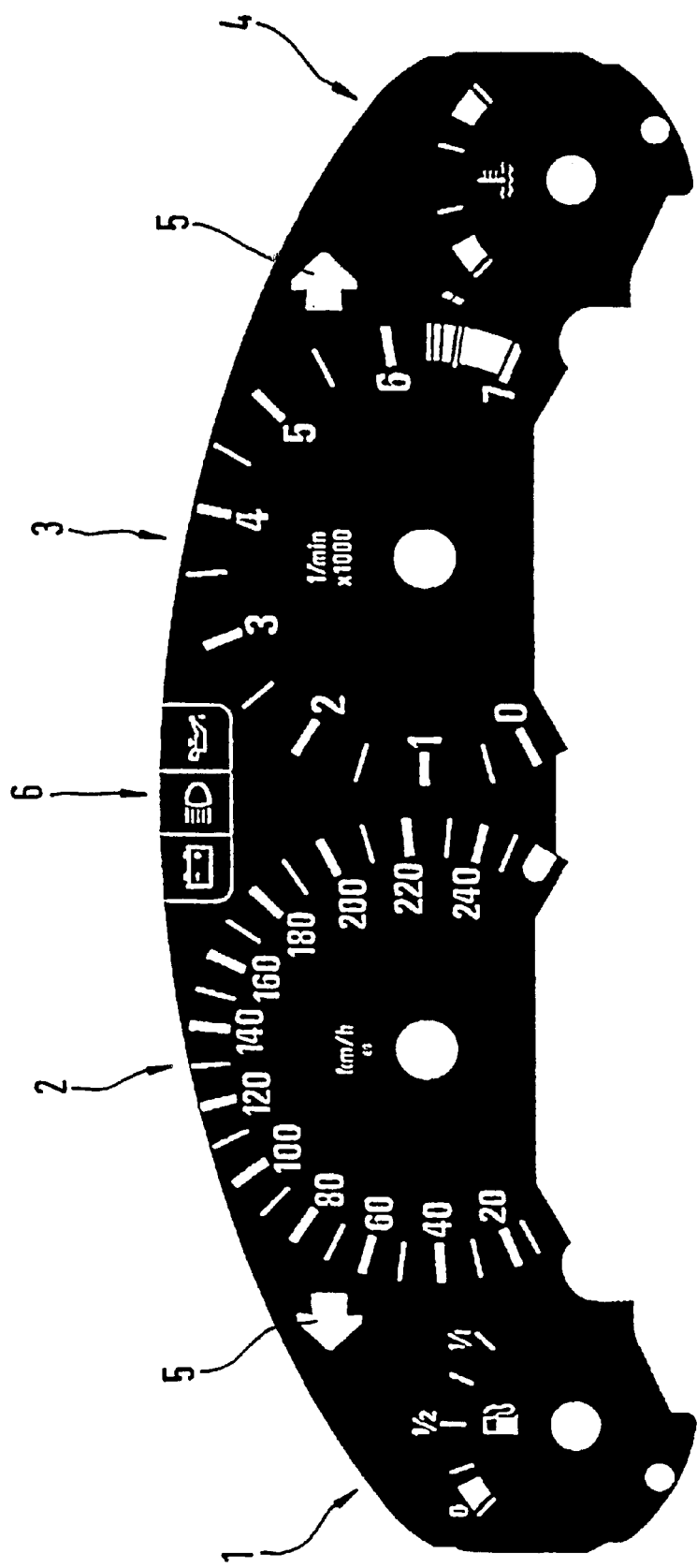
FIG. 1 shows a view of an instrument panel.

The instrument panel represented in FIG. 1 is an instrument panel for a display in a motor vehicle and has a scale 1 with a symbol for the fuel tank filling level, a scale 2 for the speed, a scale 3 for the engine rpm as well as a scale 4 with a symbol for the washing water filling level. Furthermore, there are two direction-indicating arrows 5 and a symbol bar 6 with warning areas for the battery, full-beam headlights and oil level.

Figure 2:
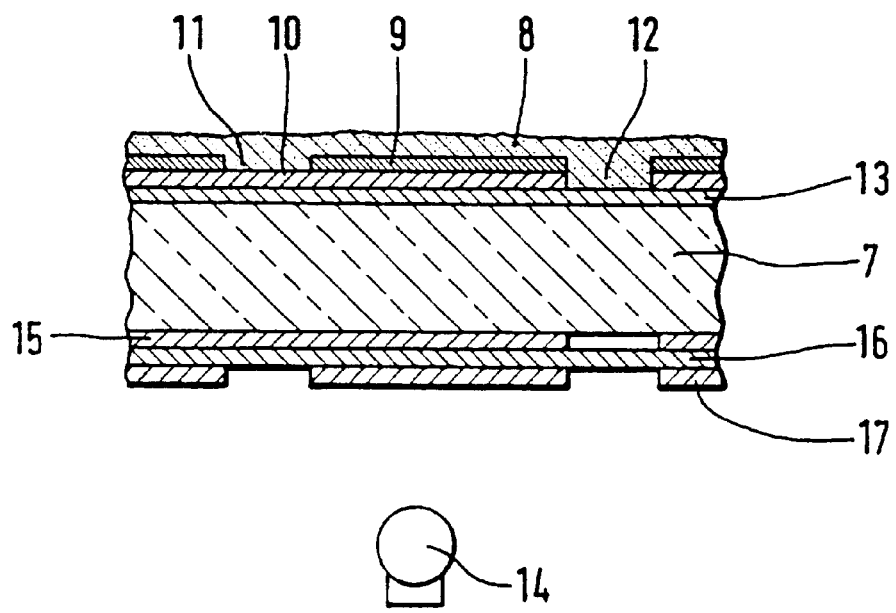
FIG. 2 shows a first exemplary embodiment of a cross section of a region of an instrument panel.
Figure 3:
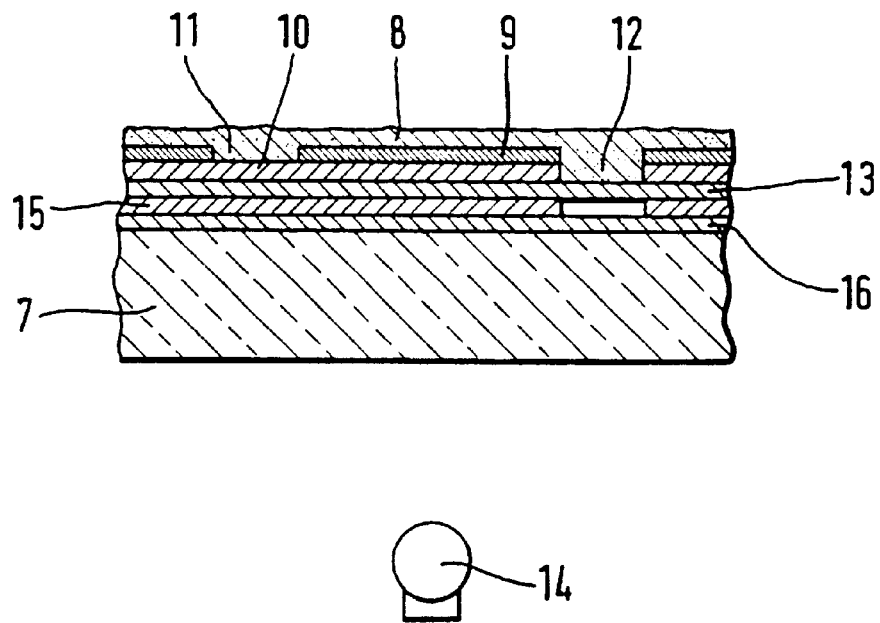
FIG. 3 shows a second exemplary embodiment of a cross section of a region of an instrument panel.
Figure 4:
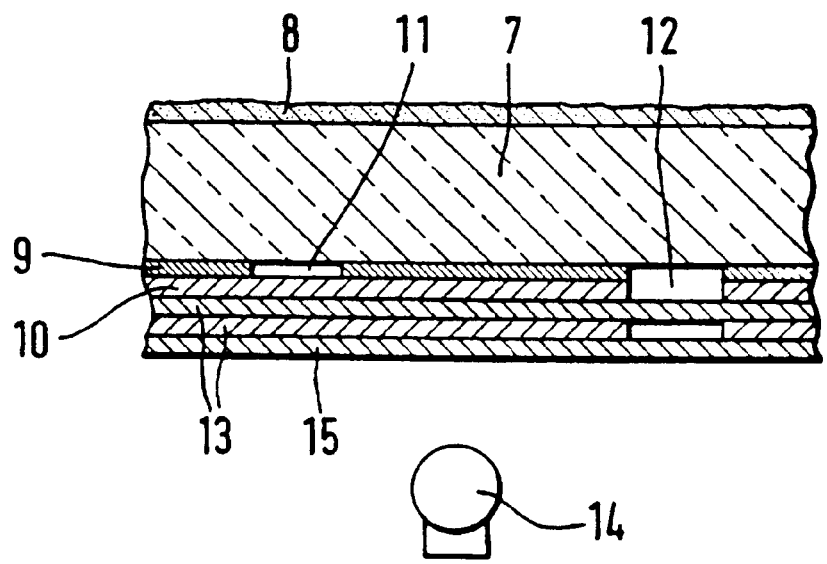
FIG. 4 shows a third exemplary embodiment of a cross section of a region of an instrument panel.
Figure 5:
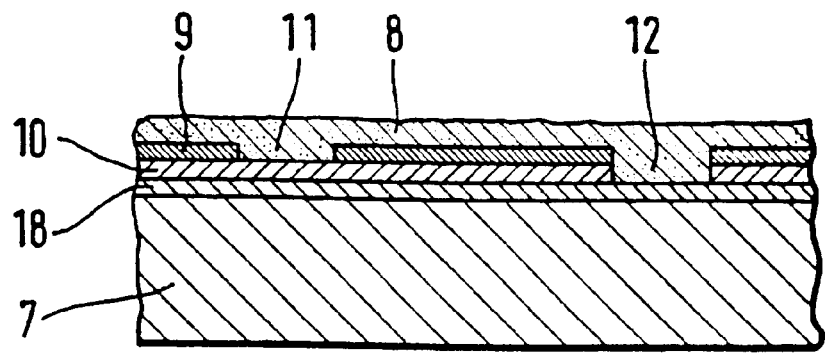
FIG. 5 shows a fourth exemplary embodiment of a cross section of a region of an instrument panel.

The exemplary embodiments of the cross-sectional construction of instrument panels represented in FIGS. 2 to 5 have a sheet-like carrier 7, which comprises a sheeting of polycarbonate and in FIGS. 2 to 4 is transparent. In FIG. 5, the carrier is of an opaque black form. It goes without saying that the carriers, in particular of FIGS. 3 and 5, may also consist of a different material, such as paper or card for example, and in this case are either translucent or non-translucent.

In FIGS. 2 to 5 there are arranged, seen from the side of the observer of the display, firstly a transparent anti-reflective layer 8 with an irregularly structured surface and an opaque black color layer 9, which covers the entire area of the carrier 7 with the exception of the scales and symbols. If the area of the carrier facing the observer has an irregularly structured surface, it is possible to dispense with the anti-reflective layer 8.

The color layer 9 could also be translucent to a slight extent. There just has to be adequate contrast with respect to the scales and symbols.

In FIGS. 2 to 4 there is a further color layer 10, which is transflective and preferably white, arranged at least in regions of the scales and symbols.

In further regions 12 of the scales and symbols in FIGS. 2 to 4 there is arranged a system of layers 13, formed by a plurality of fully or partially transparent color layers, so that the region 11 of the scales and symbols can be seen in a white color and the region 12 of the scales and symbols can be seen in the mixed color of the system of layers 13 (for example red) when illuminated from the observer side (daylight, illumination by incident light).

The exemplary embodiments of FIGS. 2 and 4 show displays which can be illuminated for night-time operation by a light source 14 arranged on the side facing away from the observer.

To make the regions 11 of the scales and symbols appear in a different color, for example green, during operation of the light source 14 than when the light source 14 is not activated, a further system of layers 15, formed by a plurality of transparent color layers fully or partially covering over one another, is arranged in the regions 11 behind the first system of layers 13. Between this system of layers 15 and the light source 14 there is an evening-out print 16, the light transmittance of which is, for example, inversely proportional to the light-intensity distribution of the light source 14, so that light of the same intensity passes through the evening-out print 16 over the area of the instrument panel.

In addition, in FIG. 2 the evening-out print 16 is provided in the regions lying opposite the at least largely opaque color layer 9 with a reflective layer 17, by which the stray light present in the carrier 7 and not leaving toward the observer side at the regions 11 and 12 can be repeatedly reflected to the observer side until it leaves toward the observer side at the regions 11 or 12. Consequently, a loss of light within Instrument panel is largely avoided.

FIG. 5 shows an instrument panel for a display which is illuminated by incident light from the side of the observer. This may take place by means of the ambient light or by means of a light source arranged in front of the display.

In the region 11 of the scales and symbols there is arranged behind the opaque color layer 9 a system of layers 13 comprising a plurality of transparent color layers fully or partially covering over one another, the mixed color of which can be seen by the observer. Behind the system of layers 13 there is on the carrier 7 a reflective layer 18, which is also arranged behind the region 12 of the scales and symbols.

The light hitting Instrument panel on the observer side passes through in the regions 11 and 12 to the reflective layer 18 and is reflected there toward the observer side. Since the light in the region 11 must pass through the transparent system of layers 13, this region appears in the mixed color of the system of layers 13 with the reflected light. The region 12, on the other hand, appears in the color in which the light is reflected by the reflective layer.

Both the systems of layers 13 and 15 and the further color layers 9 and 10 as well as the evening-out print 16 and, if appropriate, also the reflective layers 17 and 18 are formed by a plurality of transparent color layers fully or partially covering over one another and respectively of the same or different coloration and are applied to the carrier 7 in a grid of points or as sheet-like areas of color. The colors of these layers are created in a simple way by the use of the basic colors yellow, magenta, cyan and black as well as white, the respective mixed color of the basic colors giving the color that can be seen by the observer when light passes through the system of layers. Consequently, any desired coloration can be created by these basic colors, without a specially prepared color having to be produced. In addition to these basic colors there is the color white, for representing the white areas. Of course, the possibility of a further color, already mixed in advance, being additionally used is not ruled out.

To be able to print Instrument panel in a simple way with high precision and with little expenditure of time, a digital printing process may be used.

We claim:

1. An instrument panel, in particular for a display in a motor vehicle, the panel having a transflective color layer, and a sheet-like carrier which carrier is transparent or translucent and on which colors have been applied on the carrier for representing a scale and/or characters and/or symbols as well as at least substantially opaque color for covering the regions outside the contours of the characters or symbols, wherein the colors of the scale (1-4) and/or the characters and/or the symbols comprise a system of layers (13, 15) formed by a plurality of transparent layers of different coloration fully or partially covering over one another, wherein the transparent color layers of the system of layers (13) are covered on an observer side by the transflective color layer (10), wherein the carrier is transilluminatable by a light source from a side thereof facing away from the observer, wherein the transparent color layers of the system of layers (13, 15) are applied to the carrier in a grid of points, wherein the colors of the layers are created by use of basic colors yellow, magenta, cyan and black and white, and wherein the transmitting light of the light source passing through the carrier radiates through the transparent color layers covering one another and thus creating the respective desired color toning by mixing of the basic colors.

2. Instrument panel according to claim 1, wherein points of said grid of points are positioned approximately between 400 and 3000 points per inch.

3. Instrument panel according to claim 2, wherein points of said grid of points are approximately 800 points per inch.

4. Instrument panel according to claim 1, wherein points of said grid of said points have different sizes.

5. Instrument panel according to claim 1, wherein the transparent color layers of the system of layers are applied to the carrier as sheet-like areas of color.

6. Instrument panel according to claim 5, wherein the sheet-like areas of color correspond to the areas of the scale and/or the characters and/or the symbols.

7. Instrument panel according to claim 1, wherein the transflective color layer (10) is white.

8. Instrument panel according to claim 1, wherein the transflective color layer (10) is cut away in parts of the scale (1-4) and/or the characters and/or the symbols and transparent color layers fully or partially covering over one another, forming a further system of layers (15), are applied to the carrier (7) in a region (12) of the cutaway.

9. Instrument panel according to claim 1, wherein an averaging print (16) corresponding to a light-intensity distribution of light source (14) is applied, fully or partially covering over the carrier, on a side of the system of layers and/or a further system of layers (13, 15) facing away from an observer.

10. Instrument panel according to claim 9, wherein the averaging print (16) comprises color layers which fully or partially cover over one another and are applied in a grid of points or as areas of color of variable density.

11. Instrument panel according to claim 1, wherein the system of layers (13) and/or a transflective layer (10) and/or a further system of layers (15) and/or an averaging print (16) are applied to the carrier (7) on a side facing an observer or on a side facing away from the observer.

12. Instrument panel according to claim 1, wherein the carrier (7) is a sheeting.

13. Instrument panel according to claim 12, wherein the carrier (7) comprises polycarbonate.

14. Instrument panel according to claim 1, further comprising an adhesion-promoter layer arranged on a side of the carrier (7) bearing a color coating, between the carrier (7) and the color coating.

15. Instrument panel according to claim 1, wherein the opaque color (9) is black.

16. Instrument panel according to claim 1, wherein each of the transparent color layers of the system of layers and/or a further system of layers (13, 15) is applied to the carrier (7) in a separate printing operation.

17. Instrument panel according to claim 1, wherein the system of layers and/or a further system of layers (13, 15) is applied to the carrier (7) as a separately created system of layers.

18. Instrument panel according to claim 1, wherein the system of layers (13) and/or a transflective layer (10) and/or a further system of layers (15) and/or an evening-out print (16) and/or an opaque color (9) are applied to the carrier (7) in separate printing operations.

19. Instrument panel according to claim 1, wherein the system of layers (13) and/or a transflective layer (10) and/or a further system of layers (15) and/or an evening-out print (16) and/or an opaque color (9) are applied to the carrier (7) as a separately created system of layers.

* * * * *